May 28, 1935.   R. BYRON   2,002,976
BAKING OVEN
Filed July 27, 1934    4 Sheets-Sheet 1

Fig. 1.

INVENTOR
Ralph Byron
BY C. Campbell Hinricks
ATTORNEY

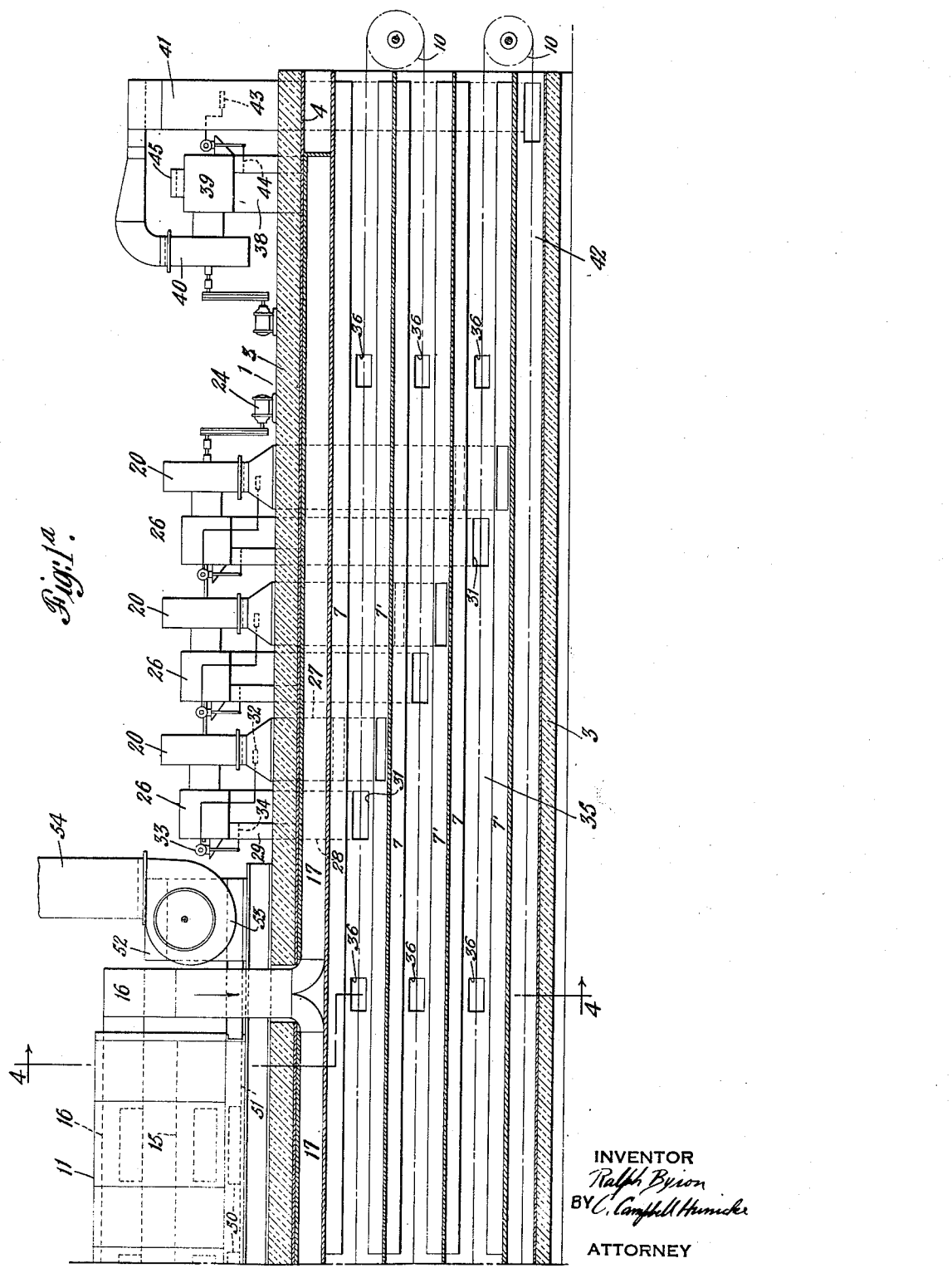

May 28, 1935.　　　　　R. BYRON　　　　　2,002,976
BAKING OVEN
Filed July 27, 1934　　　4 Sheets-Sheet 3
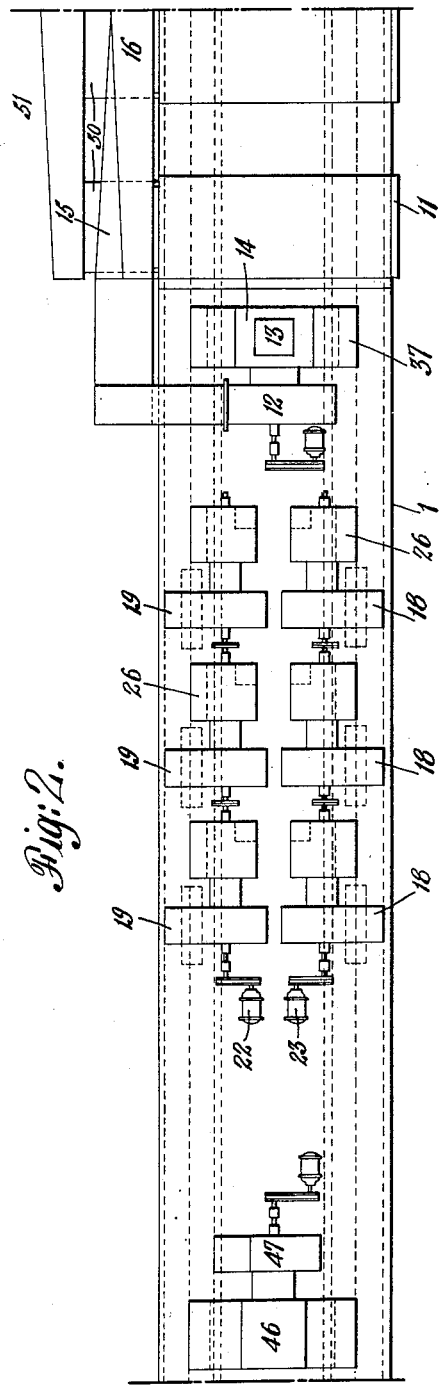
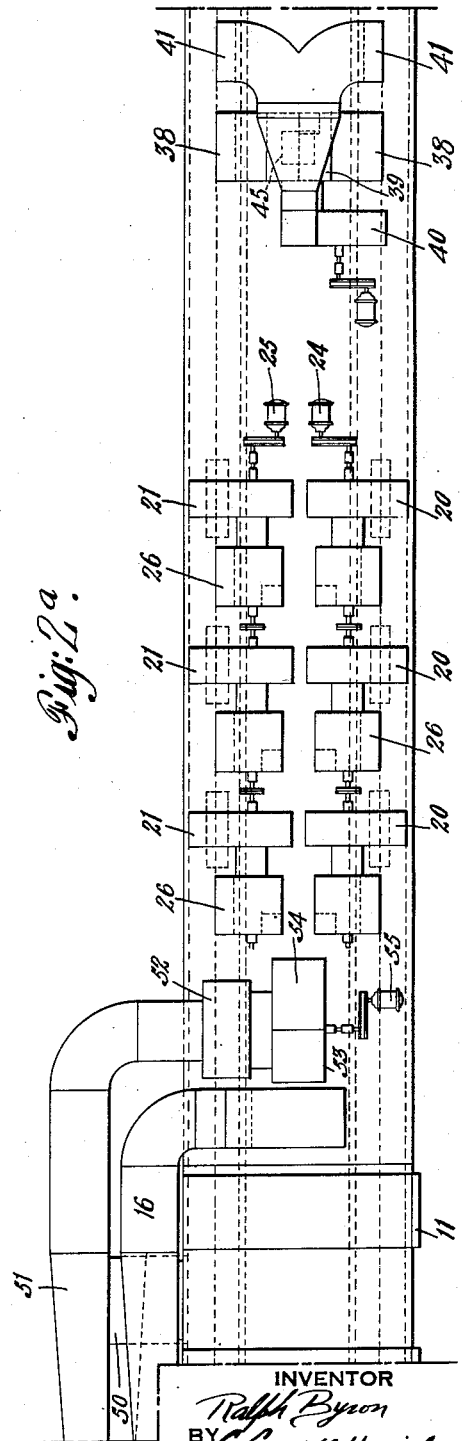
INVENTOR
Ralph Byron
BY C. Campbell Hunicke
ATTORNEY May 28, 1935.  R. BYRON  2,002,976
BAKING OVEN
Filed July 27, 1934    4 Sheets—Sheet 4
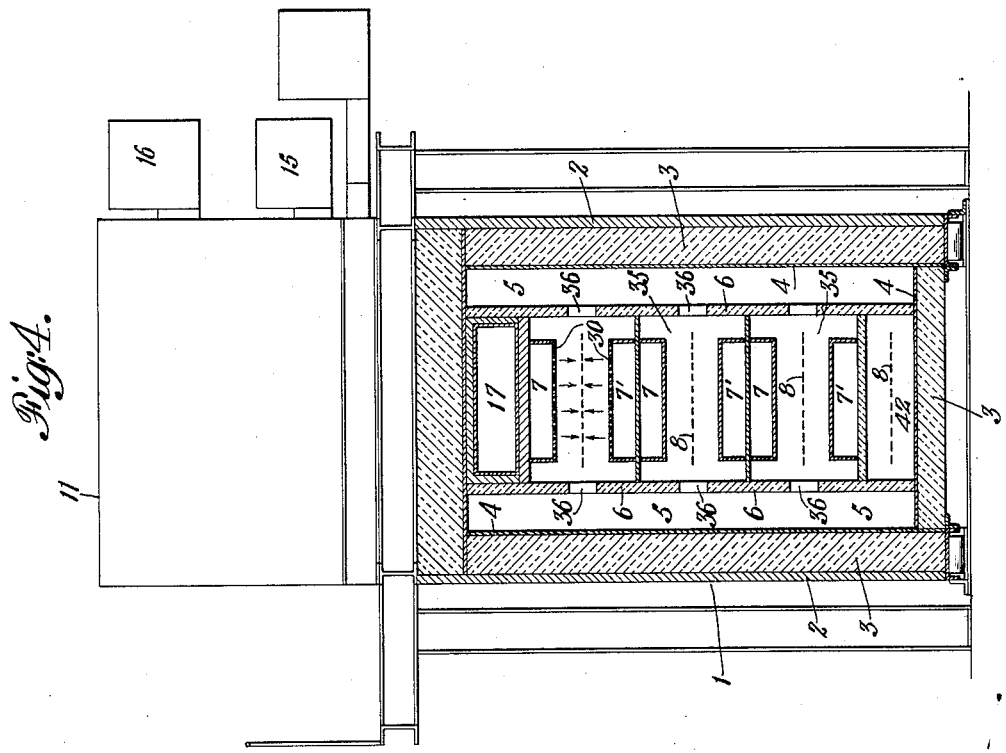
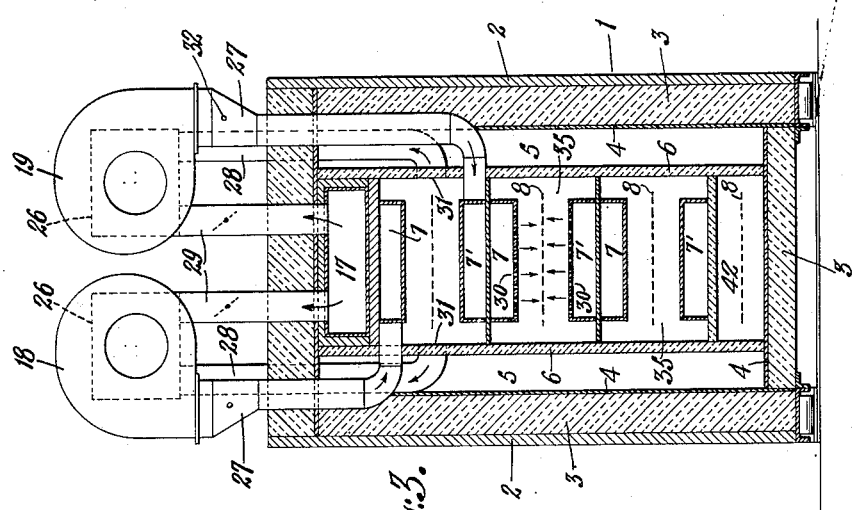
INVENTOR
Ralph Byron
BY C. Campbell Hunicke
ATTORNEY Patented May 28, 1935

2,002,976

UNITED STATES PATENT OFFICE 2,002,976

BAKING OVEN

Ralph Byron, New York, N. Y., assignor to J. O.
Ross Engineering Corporation, New York, N. Y.,
a corporation of New York Application July 27, 1934, Serial No. 737,233

11 Claims. (Cl. 107—55)

This invention relates to a baking oven.

The use of a direct flame in a baking oven or the circulation of superheated steam or hot gases in radiating tubes as a heating medium has been generally customary in ovens for baking breads, biscuits, etc.

In the baking of foodstuffs, it is frequently desirable to brown the surface of the product which may be accomplished by three forms of heating such as by conduction, by radiation, or by convection such as the contact of the products of combustion in an oven with the material being baked. In addition to the necessity of providing one or more of the three forms of heat, temperature control must be had. Some products require an even temperature, others high initial and low final temperature, still others a low initial and high final temperature.

It may therefore be desirable to provide a zone system in the oven so that particular portions of the oven can be separately controlled as to temperature. Also it may be desirable to control the heat transfer which may take place either by conduction, convection or radiation or by combinations of the three with a control of the relative proportions of heat transfer of any of the three forms and of the relative proportion of each. By controlling the proportions of heat transfer through the various means, different foodstuffs may be baked with the accomplishment of browning and proper baking. In addition to the problem of adapting an oven for the baking of a wide variety of foodstuffs there is the problem of economy of operation and installation as well as the problem of conserving space. The problem of economies of operation is accomplished to a great extent by having zones in the oven and by the recirculation of as large an amount of the heating medium as possible. Economies of installation are accomplished by standardized unit sectional construction and economies of space by a multiplicity of passes of the product within the oven.

One of the objects of this invention is to provide a baking oven wherein the form of heat transfer is controlled and the proportions of radiant heat, conducted heat and convected heat are variable as required.

Another object of this invention is to recirculate a part of the heating medium.

A further object of the invention is to reduce the heating medium circulatory ducts to a minimum and to surround the baking oven by chambers of spent heating medium which chambers serve to reduce the radiation from the baking oven and said chambers further provide a balance or relief of the heating medium pressure whereby uniform pressure is maintained throughout the baking oven.

A further object of the invention is to control the temperatures in the various zones automatically both above and below the material by the amount of heating medium that is added to the recirculated heating medium.

A still further object is to control independently the heating medium admitted above the material being baked from that admitted below the material being baked and independently controlling the temperatures in the several zones.

Still another object of the invention is to increase the efficiency and decrease the operating costs while at the same time furnishing a better product.

Referring to the drawings:

Figure 1 is a view in elevation of the lefthand portion of a baking oven embodying the principles of my invention.

Figure 1a is a view in elevation of the right hand portion of a baking oven embodying the principles of my invention.

Figure 2 is a plan view of Figure 1.

Figure 2a is a plan view of Figure 1a.

Figure 3 is a cross sectional view of Figure 1 along the line 3, 3, looking in the direction of the arrows.

Figure 4 is a sectional view of Figure 1a along the line 4, 4, looking in the direction of the arrows.

In carrying out my invention, I propose to provide an oven 1 having metal outer walls 2, insulated by heat insulating material 3 and an interior metal wall 4. Upon the sides internally, chambers 5 are formed by metal walls 4 and internal paneled insulated walls 6. Between walls 6, I provide heating medium ducts 7 above the material to be heated and ducts 7' below the material to be heated. An endless carrier 8 is carried in any well known manner. Carrier 8 may be two endless chains with pans pivotally supported whereby the pans may operate in pendulum fashion when carried around the sprockets 9 and 10 at the ends to make the passes. Obviously, any method wherein the pan is maintained without dumping the contents can be used.

The heating system and circulatory system will now be described.

The heater 11, I preferably place on top of oven 1 for economy of space and to reduce losses from long leads. This heater 11 may be of any well known type of combustion chamber and heat interchanger, or it may be all of the type wherein the recirculated air is passed through a combustion chamber and the products of combustion act directly as the heating medium. The form of supply of heat is immaterial so far as the present invention is concerned except that it must supply a sufficient quantity at the required temperature. The recirculated heating medium and the fresh heating medium are caused to circulate by blower 12. Opening 13 admits fresh air to the mixing chamber 14. The heating medium is then conducted through conduit 15 being forced by blower 12 through the heater 11, and out through conduit 16 which leads into the top of oven 1 wherein a chamber or header 17 is formed. At predetermined parts of the oven I provide a series of blowers 18, 19, 20, and 21. These blowers can be driven each by a separate motor or in series of threes. For instance, blowers 19 are driven by motor 22, blowers 18 by motor 23, blowers 20 by motor 24, blowers 21 by motor 25. The arrangement shown enables controlling the heating medium either to the top or bottom or both as desired in the particular section or station. Each station consists of a circulating fan 18 and inlet mixing box 26, a supply conduit 27, a return conduit 28 and a hot air control conduit 29. Blower 18 or 19, 20, 21 forces the heating medium through conduit 27 into ducts 7, or 7', where the heating medium passes through orifices 30 onto the material being baked. It then returns through the opening 31 in panel 6 into duct 28 which leads into mixing box 26 where it again enters the blower for recirculation. During this circuit the temperature of the heating medium drops which effects the control bulb 32 which actuates a damper motor 33, opening damper 34 and permitting the high temperature heating medium in duct 17 to pass through duct 29 into the mixing box 26 in order to bring the circulating heating medium to the proper temperature. Control bulb 32 continuously actuates to open or close damper 34 to maintain the predetermined temperature of heating medium emitted from duct 7. Similarly blower 19 functions to emit below the material being baked the circulating heating medium in the same manner as previously described. Each blower and mixing chamber therefore supplies and forms a separate station whereby a zone control may be had in the oven.

The excess circulating air passes from the oven chamber 35 through openings 36 into chambers 5 and is withdrawn from chambers 5 through conduit 37 by blower 12 through mixing chamber 14, this cycle being continuously repeated.

Aside from controlling the zone temperatures which is essential for the proper baking, the control of the radiant heat transfer, convective heat transfer and conductive heat transfer are accomplished as follows:

The proportion of radiant heat transfer is dependent upon the temperature of the duct containing the circulating medium. The convective heat is proportional to the temperature, volume, and velocity of the heating medium directed against the material being baked.

The volume is controlled by controlling the speed of the blowers and the velocity by the size of the orifices and the speed of the blowers. The orifices 30 may be varied as to size but in carrying out my invention I have only shown the variation of the speed of the blower. The thermostatic control of the various dampers at the different stations controls the temperature variations. The control by conduction I accomplish by a novel method which consists in an auxiliary circulating heating medium system to provide a preliminary heating of the pans whereby they are brought to the proper temperature so that when the products to be baked are inserted in the pans the required heat transfer by conduction takes place. Certain products require immediate heating by conduction in order for the proper chemical and physical changes to take place while other foodstuffs do not require this immediate heating by conduction. I have therefore provided the separate system so that when not required it can be shut down.

The operation of this system is as follows:

Heating medium is taken from chamber 5 through duct 38 into mixing box 39 passing through blower 40 from whence it passes through conduit 41 down to the preheating chamber 42. The air is discharged horizontally into chamber 42 blowing towards the opposite end of the preheat zone. The temperature of heating medium in duct 41 is controlled by the bulb 43 which actuates the automatic damper 44 controlling the volume of high temperature heating medium passing from duct 17 into mixing box 39. In such cases where the temperature required in duct 41 is below the temperature of circulating medium coming from chamber 5 cold fresh air is permitted to enter the mixing box 39 through fresh air intake 45. The heating medium passing through chamber 42 to the opposite end of the oven and countercurrently to the direction of travel of the entering pans passes through duct 46 into fan 47 from whence it is discharged to atmosphere. In such cases where fan 40 is not operated the opening from chamber 42 into duct 46 is manually closed by damper 48 and a connection from chamber 5 into duct 46 is manually opened by damper 49. The purpose of exhausting some of the circulating heating medium is to prevent the building up of excess pressures and to remove the excess moisture from the circulating heating medium by exhausting predetermined amounts to the atmosphere.

It should be noted by my invention that the use of recirculated heating medium reaches the maximum that can be so used with any particular product since the amount that is exhausted is the minimum for the product and can be separately controlled particularly as chambers 5 form a relief for the oven chamber proper.

What I claim is:

1. In a baking oven, an oven chamber in combination with a source of heating medium supply, a duct lengthwise of the oven to receive the hot heating medium, individual units comprising a blower, mixing chamber and ducts communicating with said hot heating medium duct and with said oven, said units stationed at predetermined points along the oven, means for controlling the quantity of hot heating medium delivered to the oven by each unit.

2. In a baking oven, means for passing the material to be baked a plurality of times through said oven, ducts above and below said material being baked, a controlled mixture of hot fresh heating medium and recirculated gases withdrawn from the oven supplied to said ducts, orifices in said ducts, means for supplying said ducts with said mixture at a plurality of points.

3. In a baking oven, means for passing the material to be baked a plurality of times through said oven, ducts above and below said material being baked, a controlled mixture of hot fresh heating medium and recirculated gases withdrawn from the oven supplied to said ducts, orifices in said ducts, means for supplying said ducts with said mixture at a plurality of points, and means for controlling the temperature of the mixture supplied at each point.

4. In a baking oven, a baking chamber, a source of heating medium directed above and below the material being baked, means for controlling the radiant heat transfer, the convective heat transfer and the conducted heat transfer independently of each other.

5. In a baking oven, an oven chamber, means for conducting material to be baked through said chamber, means for preheating the baking pans to control the conductive heat transfer, said means comprising a passageway for the carrier for the baking material, means for directing a current of heating medium through said passageway while controlling the temperature of said heating medium preliminary to the insertion of the product to be baked, a duct containing the circulating heating medium, means for controlling the radiant heat transfer by controlling the temperature of said duct containing the circulating heating medium, and means for controlling the convective heat transfer by separate means controlling the temperature, volume and velocity of the heating medium directed against the material being baked.

6. In a baking oven, a baking chamber, means for passing the material to be baked a plurality of times lengthwise of the chamber, lateral chambers communicating with said baking chamber, a duct for fresh hot heating medium lengthwise of said oven, means for furnishing hot heating medium to said duct, a plurality of additional means adapted to withdraw from said baking chambers and from said duct a mixture of hot heating medium and recirculated gas and deliver same onto the medium to be heated.

7. In a baking oven, a baking chamber, means for passing the material to be baked a plurality of times lengthwise of the chamber, lateral chambers communicating with said baking chamber, a duct for fresh hot heating medium lengthwise of said oven, means for furnishing hot heating medium to said duct, a plurality of additional means adapted to withdraw from said baking chamber and from said duct a mixture of hot heating medium and recirculated gas and deliver same onto the medium to be heated, and means for controlling the proportions of said mixture of hot heating medium and recirculated gas prior to each delivery into said baking oven.

8. In a baking oven, a baking chamber, means for passing the material to be baked a plurality of times lengthwise of the chamber, lateral chambers communicating with said baking chamber, a duct for fresh hot heating medium lengthwise of said oven, means for furnishing hot heating medium to said duct, a plurality of additional means adapted to withdraw from said baking chamber and from said duct a mixture of hot heating medium and recirculated gas and deliver same onto the medium to be heated, means for controlling the proportions of said mixture at each station, and means for withdrawing gases from said oven to prevent excess pressures within said oven.

9. In a baking oven, an oven chamber, an endless carrier having a plurality of passes within said chamber and one pass exteriorally of said chamber, means for heating said carrier in said exterior pass, chambers on each side of said oven chamber for the relief of pressure in said oven chamber and to permit recirculation of the gases from said oven and reheating of same, means for controlling the temperature and quantity of heating medium directed against the products, and means for directing and supplying heating medium against said products.

10. In a baking oven, an oven chamber, lateral chambers on each side of said oven chamber, external walls for said lateral chambers, heating medium ducts above and below the material to be heated, an endless carrier having a plurality of passes within said oven, a heater for said oven, a blower, a chamber, said lateral chambers communicating with said oven, means for withdrawing spent heated gases from said lateral chambers to said mixing chamber, a duct lengthwise of the heater, conduits from said mixing chamber to said duct, a fresh air inlet to said mixing chamber, a damper in said inlet, a plurality of blowers stationed along said oven and exteriorally thereof, mixing boxes for said blowers, conduits from said duct containing the heating medium to said mixing boxes and from said baking chambers to said mixing boxes, conduits from said mixing boxes to ducts above and below the material being baked, dampers within said conduits, thermostatic controls for said dampers, and means for operating said blowers at predetermined controlled speeds.

11. In a baking oven, an oven chamber, lateral chambers on each side of said oven chamber, external walls for said lateral chambers, heating medium ducts above and below the material to be heated, an endless carrier having a plurality of passes within said oven, a heater for said oven, a blower, a mixing chamber, said lateral chambers communicating with said oven, means for withdrawing spent heated gases from said lateral chambers to said mixing chamber, a fresh air inlet to said mixing chamber, a damper in said inlet, a blower connected to said mixing chamber, conduits from said blower to said heater, a duct lengthwise of the oven, a plurality of blowers stationed along said oven and exteriorly thereof, mixing boxes for said blowers, conduits from said duct containing the heating medium to said mixing boxes and from said baking chamber to said mixing boxes, conduits from said mixing boxes to said blower inlets, conduits from said blower outlets to ducts above and below the material being baked, dampers in the ducts leading from the heating medium duct into the mixing box, thermostatic controls for said dampers, means for operating said blowers at predetermined controlled speeds, and means for preheating the endless carrier and pans for the material to be heated.

RALPH BYRON.